(12) United States Patent
Pilu

(10) Patent No.: US 7,714,898 B2
(45) Date of Patent: May 11, 2010

(54) IMAGE CAPTURE DEVICE HAVING A LEARNING FUNCTION

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1212 days.

(21) Appl. No.: 10/889,386

(22) Filed: Jul. 12, 2004

(65) Prior Publication Data
US 2005/0030387 A1 Feb. 10, 2005

(30) Foreign Application Priority Data
Jul. 26, 2003 (GB) .................. 0317541.1

(51) Int. Cl.
*G03B 17/00* (2006.01)
(52) U.S. Cl. .................... 348/222.1; 382/155; 382/160; 396/48; 348/207.99
(58) Field of Classification Search ............ 348/208.15; 396/49
See application file for complete search history.

(56) References Cited

U.S. PATENT DOCUMENTS

| | | | |
|---|---|---|---|
| 5,179,596 A * | 1/1993 | Weingard ................... | 382/158 |
| 5,227,835 A | 7/1993 | Anagnostopoulos | |
| 5,331,365 A * | 7/1994 | Miyazawa et al. ............ | 396/51 |
| 5,359,385 A | 10/1994 | Ishida et al. | |
| 5,515,131 A * | 5/1996 | Ohmori et al. ................ | 396/51 |
| 5,625,711 A * | 4/1997 | Nicholson et al. ........... | 382/224 |
| 5,634,140 A | 5/1997 | Hamada et al. | |
| 5,680,480 A * | 10/1997 | Beernink et al. ............. | 382/187 |
| 5,831,670 A * | 11/1998 | Suzuki ................... | 348/208.15 |
| 6,301,440 B1 * | 10/2001 | Bolle et al. ................. | 396/128 |
| 6,480,237 B1 * | 11/2002 | Jun ........................... | 348/558 |
| 6,771,306 B2 * | 8/2004 | Trajkovic et al. ............ | 348/170 |
| 7,307,636 B2 * | 12/2007 | Matraszek et al. .......... | 345/581 |
| 2004/0101212 A1* | 5/2004 | Fedorovskaya et al. ..... | 382/305 |

FOREIGN PATENT DOCUMENTS

JP 5137057 6/1993

OTHER PUBLICATIONS

The Patent Office, Search Report Under Section 17, Dec. 8, 2003.

* cited by examiner

*Primary Examiner*—Sinh Tran
*Assistant Examiner*—Paul Berardesca

(57) ABSTRACT

Embodiments provide for an image capture device having a learning function. Briefly described, one embodiment comprises at least one manual control adapted to generate a control signal that controls image capture operation, the control operable by a user of the image capture device; at least one sensor adapted to sense an operating condition during image capture; a first element adapted to analyse inputs from the sensor to learn at least one associated operating condition, and adapted to analyse the control signal to learn a corresponding preference of the user; a second element adapted to predict a value corresponding to the control signal and the associated operating condition; and a third element adapted to compare the predicted value and the control signal, and adapted to determine a confidence level from the compared predicted value and control signal, wherein the confidence level corresponds to a degree of confidence in the predicted value.

47 Claims, 2 Drawing Sheets

IMAGE CAPTURE DEVICE HAVING A LEARNING FUNCTION

TECHNICAL FIELD

Embodiments relate to an image capture device having a learning function.

CLAIM TO PRIORITY

This application claims priority to copending United Kingdom utility application entitled, "Image Capture Device Having A Learning Function," having serial no. GB 0317541.1, filed Jul. 26, 2003, which is entirely incorporated herein by reference.

BACKGROUND

It is an interest in the field of camera manufacture to look at ways to make the operation of cameras more and more automatic. Cameras are already widely available that detect various settings for a subject at which a camera is pointed to provide better focus or exposure by measuring light levels and also by determining which part of a field of view should be made the subject of camera focus.

Cameras also exist that use learning mechanisms that respond to sensorial inputs, such as an image in an image field of the camera. "Unsupervised clustering of ambulatory audio and video" by Clarkson and Pentland (1998), Proceedings of the International Conference of Acoustics, Speech and Signal Processing, Phoenix, Ariz. 1999 (incorporated herein by reference) describes a camera with a method that learns to cluster situations, such as supermarket or office, based upon audio and video clues. The training of this system uses a Hidden Markov Model (HMM) that is trained by labeling situations manually.

A further example is provided in "Context Awareness by Analysed Accelerometer Data" (Randell & Muller. Editors MacIntyre & Ianucci, The Fourth International Symposium on Wearable Computers, pp 175-176, IEEE Computer Society, October 2002, incorporated herein by reference) which describes user input being used to train a clustering based situation classification system.

EP 1,109,132 (incorporated herein by reference) uses a user's opinion on the images presented, after they are captured, in a reinforcement learning framework to refine the ability of the system to predict what the user likes.

SUMMARY

Embodiments provide a system and method for training an image capture device. Briefly described, one embodiment comprises at least one manual control adapted to generate a control signal that controls image capture operation, the control operable by a user of the image capture device; at least one sensor adapted to sense an operating condition during image capture; a first element adapted to analyse inputs from the sensor to learn at least one associated operating condition, and adapted to analyse the control signal to learn a corresponding preference of the user; a second element adapted to predict a value corresponding to the control signal and the associated operating condition; and a third element adapted to compare the predicted value and the control signal, and adapted to determine a confidence level from the compared predicted value and control signal, wherein the confidence level corresponds to a degree of confidence in the predicted value.

Another embodiment is a method that comprises sensing an environment operating condition preceding image capture; predicting at least one image capture control parameter corresponding to a user specifiable control parameter, the predicting based upon learned behavior of the user during prior similar environment operating conditions and the sensed environment operating condition; indicating a confidence level that corresponds to a degree of confidence in the predicted image capture control parameter; and capturing an image in accordance with the predicted image capture control parameter.

BRIEF DESCRIPTION OF THE DRAWINGS

For a better understanding of the invention, and to show how embodiments of the same may be brought into effect, reference will now be made, by way of example, to the accompanying diagrammatic drawing, in which.

DETAILED DESCRIPTION

Figure 1:
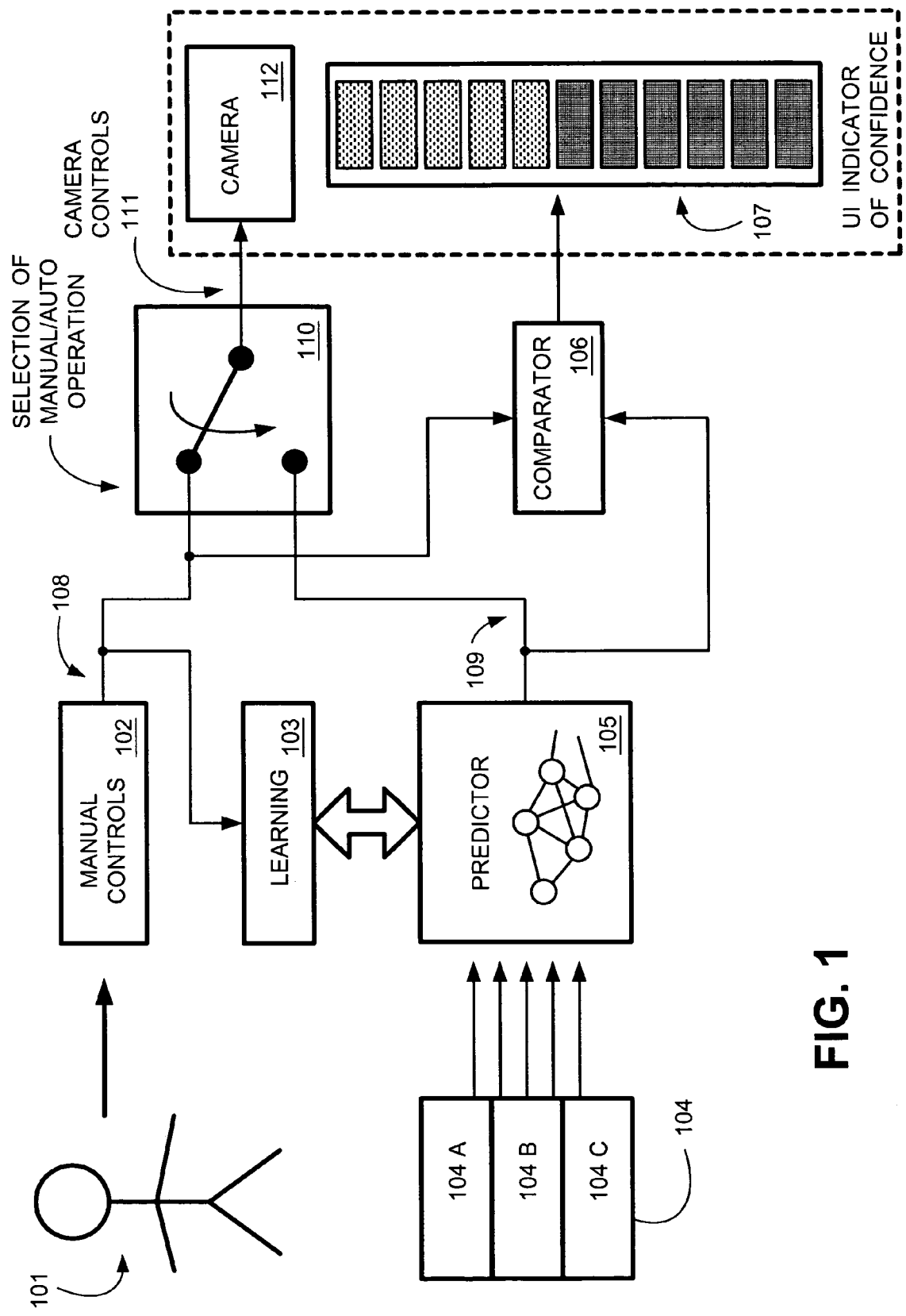
FIG. 1 is a schematic flow diagram of an image capture device having a learning function.

FIG. 1 is a schematic flow diagram of an image capture device having a learning function. A camera 112 has manual controls 102 and a predictor of user interest 105, both of which produce camera control parameter signals 108, 109 respectively, such as shutter and exposure and other usual controls of a camera 112.

The camera 112 can be controlled manually by a user 101 using manual controls 102 to provide control signals 108 to the camera 112. The camera 112 can also be controlled automatically by the predictor 105 by signals 109 provided to the camera 112. Alternatively, the camera 112 can be operated by a combination of manual controls 102 operated by the user and by signals 109 from the predictor 105.

A logical switch 110 selects the mode of operation, which may be either fully manual using the manual controls 102 or fully automatic using the predictor 105, or a mixture of the two.

The manual controls 102 are operated by the user 101 in a conventional way. For example, zoom setting, shutter operation, time lapse, video capture (including length of video capture), video snapshot capture, audio clip capture and the usual options for a camera, be it a stills camera or a video camera.

The predictor 105 could be implemented using a neural network, a Hidden Markov Model, or another trainable method that can produce outputs in response to inputs according to parameters at least partially determined by a training process. Both neural networks and Hidden Markov Models are well known concepts for which implementations are well known. A Hidden Markov Model implementation involves the establishment of a number of Hidden Markov Models which are identified (in pre-training or by a user) against input data as representing a desired output value (or set of output values) or a null value. In the simplest case of the invention, there may be one (or more) Hidden Markov Models representing a picture taking event (or a specific type of picture taking event) and a null Model indicating that no picture taking event should occur. The predictor would then match the input data that it receives against the set of Hidden Markov Models to determine the best match, and in preferred embodiments the degree of confidence attached to that match.

In some embodiments, the predictor 105 makes use of relevance feedback, such as that described in "Relevance Feedback: A Power Tool in Interactive Content-based Image Retrieval," IEEE Transactions on Circuits and Systems for Video Technology, Special Issue on Segmentation, Description and Retrieval of Video Content, vol. 8 pp. 644-655, September 1998, see Y. Rui, T. Huang, M. Ortega, and S. Mehrotra (incorporated herein by reference). Furthermore, EP 444,685 "Camera having Learning Function" (incorporated herein by reference) discloses a suitable learning algorithm for this implementation, all incorporated by reference herein.

The predictor 105 has inputs from sensors 104 which include, in some embodiments, motion sensors 104a which are operable to detect motion of the camera 112, such as left to right motion or up/down motion, as well as camera shake. A motion sensor may be a miniature gyroscopic device such as a Murata Enc 03J, which is a piezoelectric type device.

The predictor 105 also takes input, in some embodiments, from image analysis inputs, an example of which is described in "Unsupervised clustering of ambulatory audio and video" by Clarkson and Pentland (1998), Proceedings of the International Conference of Acoustics, Speech and Signal Processing, Phoenix, Ariz. 1999 (incorporated herein by reference).

The predictor 105 also takes input from biometric sensors 104c in some embodiments. Various biometric sensors 104c may be used, such as those detecting skin conductivity, perhaps of a user's finger on a shutter button. The skin conductivity of a user changes when he is interested in a particular subject. A suitable implementation of the use of skin conductivity and showing interest may be found in "StartleCam: A Cybernetic Wearable Camera", in Proceedings of the International Symposium on Wearable Computers, pages 42-49, 1998, J. Healey and R. W. Picard (incorporated herein by reference).

The biometric sensors 104c may also include the use of brain activity measurements to measure a user's interest. Details for implementation of such a sensor are provided in "Summarising Wearable Video," IEEE Int. Conf. on Image Processing, III:398-401, Thessaloniki, Greece, 2001, K. Aizawa, K.-I. Ishijima, M. Shiina (incorporated herein by reference).

Furthermore, other sensors 104 may be incorporated as input devices for the predictor 105. A face expression may be detected by one of the sensors 104b to give an indication to the camera of when an image may be of interest to the user 101—see for example "Automatic Analysis of Facial Expressions: The State of the Art", Maja Pantic, Leon J. M. Rothkrantz, IEEE Transactions of Pattern Analysis and Machine Intelligence, December 2000 (Vol. 22, No. 12), pp. 1424-1445 (incorporated herein by reference). Also, an eye movement sensor may be provided.

As the user 101 operates the camera 112, the manually set control parameters 108 (for example when the user is taking shots or turning audio capture on) are used as examples to train the predictor 105 through a learning module 103. Thus, the predictor 105 predicts user interest against the actual input measured by the sensors 104. In this way, the camera 112 learns the user's image capture behaviour, i.e. how the user 101 is using the camera 112 and in which situations the user is taking pictures. The learning is achieved during normal use of the camera by the user 101.

A comparator 106 is also provided, which comparator 106 receives inputs from the predictor 105 and also from the manual controls 102 via the manual control signals 108. The comparator 106 compares the predictions of the predictor 105 with the actual control signals 108 inputted by the user 101. With this comparison a confidence level is derived. The confidence level is passed for display to a graphical indicator of user confidence 107. The system may alternatively indicate confidence by an audio signal.

The user will know that the camera 112 can be trusted to operate automatically in some situations when the predictions of the predictor 105 are consistently accurate, according to some, such as a percentage of success. A prediction failure may be logged if the predictor 105 does not predict an image capture opportunity of interest to the user within a predefined time period, such as one second, of the user operating the camera controls 102. Alternatively, the camera 112 could refuse to be set in automatic mode, for instance by omitting an audio tone, to indicate that the comparator 106 has determined that the predictor 105 is providing predictions 109 of insufficient accuracy.

The camera 112 described herein is particularly advantageous in incorporating a learning module 103 which controls the predictor 105 to adjust the parameters output by the predictor 105 relating to the user's interest.

Furthermore, manual use of the camera 112 manual control signals 108 is used to train, either from scratch, or by fine tuning, the predictor 105 with the learning module 103 by making use of the current manual control signals 108 to the camera 112.

The camera 112, by use of the predictor 105, can be used to automatically operate at least some of the camera functions, by predicting when the user 101 is interested in a particular view. The automatic operation can be to take a camera shot automatically, based upon the current and passed manual control signals 108 from the user 101.

In one embodiment, the camera 112 also provides a useful comparison between predicted camera operation from the predictor 105 and the actual operation (resulting from use of the manual controls 102). The comparison is indicated through the confidence graphical indicator 107, which gives the level of confidence of the camera 112 in predicting the user preferences and operation of the camera 112.

In other embodiments, the comparator 106 is operable to log failures as well as successes when the camera 112 is operating in manual mode via the manual controls 102. The camera 112 could be reporting where/when it failed, for example indoors, or when there are too many subjects for image capture, by means of analysis of the inputs from the sensors 104. In this way, the user 101 can judge by means of the confidence graphical indicator 107 whether the camera 112 has learnt sufficiently to operate in the particular conditions. The graphical indicator 107 may include an indication of environment type associated with the level of confidence to provide this information, such as a high level for indoor situations, or a low confidence level for outdoor situations.

In a situation where the switch 110 is put to automatic mode when the predictor 105 has a poor confidence level, the statistics resulting from the failure could be stored to modify how the predictor 105 operates in one embodiment. For example, if a situation has been detected where the predictor 105 is likely to fail, then the camera 112 will lower a threshold for an image capture decision to thereby operate by taking more shots than would otherwise normally be required, to compensate for poor predicted performance.

Embodiments of the camera 112 may be "pre-trained" based on an average user before being provided to an end user 101, in which situation it will be necessary for an end user 101 only to fine tune the predictor 105 parameters by normal use. Another option for the camera 112 is to allow the user 101 to switch off the training mode via the graphical indicator 107 which graphical indicator doubles as a user interface.

The camera described herein can learn when to take pictures and how those pictures should be taken based on manual inputs.

In one embodiment, the prediction accuracy indicator indicates to a user a low level of prediction accuracy in the event that a user selects or attempts to select the automatic control of the image capture device by the learning/predictor element. In another embodiment, the learning/predictor element is adapted to lower a threshold for an image capture decision in the event of a low level prediction accuracy.

In one embodiment, the camera 112 can indicate to a user 101 when it is ready for automatic operation, via the comparator 106 and display 107 has significant advantages.

Figure 2:
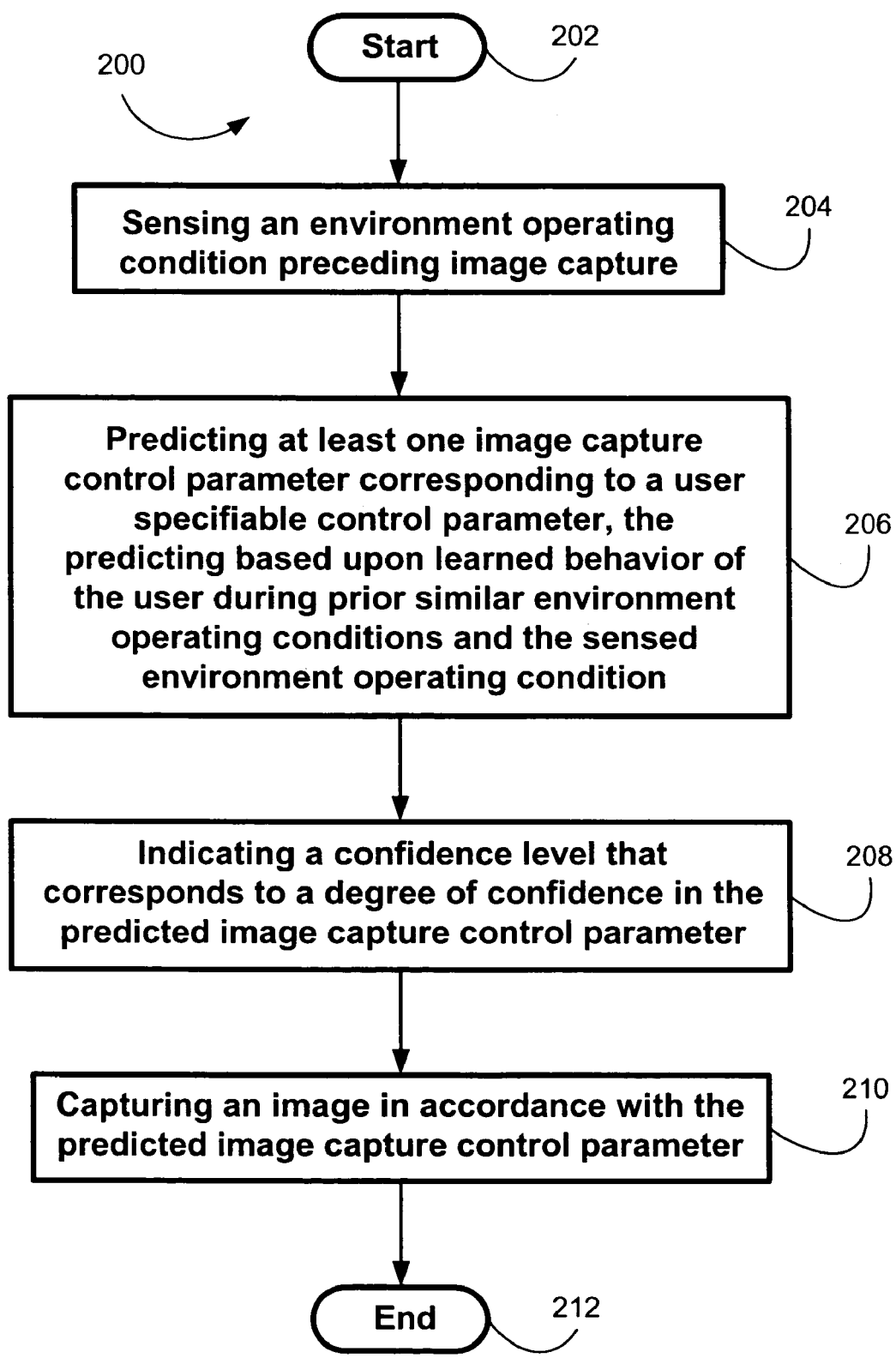
FIG. 2 is a flow chart illustrating a process of exemplary embodiments of the learning element and the predictor element of FIG. 1.

FIG. 2 is a flow chart 200 illustrating a process of exemplary embodiments of the learning element 103 and the predictor element 105 of FIG. 1. The flow chart 200 shows the architecture, functionality, and operation of a possible implementation of the software for implementing the learning element 103 and the predictor element 105. In this regard, each block may represent a module, segment, or portion of code, which comprises one or more executable instructions for implementing the specified logical function(s). It should also be noted that in some alternative implementations, the functions noted in the blocks may occur out of the order noted in FIG. 1 or may include additional functions without departing significantly from the functionality of the learning element 103 and the predictor element 105. For example, two blocks shown in succession in FIG. 2 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The process starts at block 202. At block 204, an environment operating condition is sensed preceding image capture. At block 206, at least one image capture control parameter is predicted corresponding to a user specifiable control parameter, the predicting based upon learned behavior of the user during prior similar environment operating conditions and the sensed environment operating condition. At block 208, a confidence level is indicated that corresponds to a degree of confidence in the predicted image capture control parameter. At block 210, an image is captured in accordance with the predicted image capture control parameter. The process ends at block 212.

An exemplary embodiment provides a camera adapted to enable automatic prediction of user choices for camera control, the camera having: a camera controller; one or more inputs to the camera controller determined externally to the camera; one or more outputs from the camera controller relating to image capture functions of the camera; wherein the camera controller comprises a trainable computation system adapted to predict values for the one or more outputs from values of the one or more inputs upon training by receipt of user indications of suitable values of the one or more outputs for actual values of the one or more inputs.

Another embodiment provides a method of training a camera adapted to enable automatic prediction of user choices for camera control, the camera having a camera controller comprising a trainable computation system, one or more inputs to the camera controller determined externally to the camera and one or more outputs from the camera controller relating to image capture functions of the camera; providing a set of values for the one or more inputs, and indicating a preferred set of values for the one or more outputs for said set of values; repeating the preceding step at least once with at least one different set of values for the one or more inputs.

Another embodiment provides a method of image capture by a camera adapted to enable automatic prediction of a user choice for image capture, the camera having a camera controller comprising a trained computation system, one or more inputs to the camera controller determined externally to the camera and an output from the camera controller representing an image capture decision; wherein the trained computation system has been trained into a trained configuration by inputting sets of values for the one or more inputs with respective user image capture decisions, the method comprising the repeated steps of: the camera controller receiving an input set of values of the one or more inputs; the trained computation system of the camera controller calculating an image capture decision in response to the input set of values and the trained configuration of the trained computer system.

In another embodiment, an image capture device incorporates controls for the operation of the image capture device and a learning/predictor element, wherein the learning/predictor element is adapted to analyse use of the controls to learn a user's image capture behaviour and to predict an image capture opportunity of interest to the user.

The reference to image capture behaviour is a reference to taking still images and moving images (e.g. video), which images may include audio capture also.

The learning/predictor element may be adapted to predict settings of the manual controls for a given image capture opportunity.

The learning/predictor element may be adapted to analyse inputs from at least one sensor of the image capture device, which sensor(s) may be one or more of an image sensor, at least one motion sensor, and/or at least one biometric sensor. That is, one or more of the inputs are sensed from a body of a user.

The biometric sensor(s) may be one or more of a skin conductivity sensor, a brain activity sensor, a facial expression sensor and/or an eye movement sensor.

The learning/predictor element may be adapted to automatically control at least one, or a plurality, of the controls of the image capture device. Said automatic control may include an image capture control, such as a shutter release.

Embodiments of an image capture device may incorporate a prediction accuracy indicator, which may be a visual indicator. The prediction accuracy indicator may be adapted, in use, to compare operation of the controls with a prediction for use of the learning/predictor element. The automatic control by the learning/predictor element may be selectable by a user. The prediction accuracy indicator may indicate to a user a low level of prediction accuracy in the event that a user selects or attempts to select the automatic control of the image capture device by the learning/predictor element.

The prediction accuracy indicator may be adapted to provide an accuracy indication in conjunction with particular environmental factors, such as an indoor or outdoor location.

The learning/predictor element may be adapted to lower a threshold for an image capture decision in the event of a low level prediction accuracy. The image capture device thereby advantageously increases the likelihood of an acceptable image being obtained.

The learning/predictor element may be pre-trained with a standard set of predictions for given control/sensor inputs.

The learning/predictor element may be adapted to be selectively enabled or disabled.

The learning/predictor element may comprise a learning unit and a predictor unit.

Another embodiment is a method of operating an image capture device includes analysing use of controls of the image capture device with a learning/predictor element of the image capture device in order to learn a user's preferences and to predict an image capture opportunity of interest to the user.

The learning may be undertaken during normal use of the controls by the user. In other embodiments, the camera may be adapted to be trained by the user by user confirmation of appropriate output values.

The user may select an automatic or semi-automatic operation of the image capture device. The user's selection may be based on an output of a prediction accuracy indictor, which may give an indication of accuracy of prediction associated with a particular environment.

According to another embodiment, one or more of the inputs are signals determined by analysis of images received by the camera.

All of the features disclosed herein may be combined with any of the above aspects, in any combination.

What is claimed is:

1. An image capture device adapted to predict user control choices, comprising:
    at least one manual control adapted to generate a control signal that controls image capture operation, the manual control operable by a user of the image capture device;
    at least one biometric sensor adapted to sense a biometric condition of the user during image capture;
    a first element adapted to analyse inputs from the biometric sensor to determine at least one associated biometric condition of the user, and adapted to analyse the control signal to learn a corresponding preference of the user;
    a second element adapted to predict a value corresponding to the control signal and the associated biometric condition of the user; and
    a third element adapted to compare the predicted value and the control signal, and adapted to determine a confidence level from the compared predicted value and control signal, wherein the confidence level corresponds to a degree of confidence in the predicted value.

2. The image capture device of claim 1, wherein the first element controls the second element.

3. The image capture device of claim 1, wherein the second element receives image analysis input.

4. The image capture device of claim 1, wherein the first element controls the second element and the second element receives image analysis input.

5. The image capture device of claim 1, wherein the second element automatically controls at least one control of the image capture device based on the predicted value.

6. The image capture device of claim 1, further comprising a confidence graphical indicator that indicates the degree of confidence in the predicted value to the user.

7. The image capture device of claim 6, wherein the confidence graphical indicator further comprises an indication of environment type corresponding to a prediction of a type of an environment during image capture, the environment type predicted by the second element based upon an environment operating condition sensed by a sensor.

8. The image capture device of claim 6, wherein the confidence graphical indicator further comprises a prediction failure.

9. The image capture device of claim 8, wherein the prediction failure indicates that prediction has not been made within one second of the user operating the image capture device.

10. The image capture device of claim 8, wherein the prediction failure prevents automatic control of the image capture device.

11. The image capture device of claim 8, wherein the prediction failure is indicated by an audible tone.

12. The image capture device of claim 1, further comprising a switch that enables use of the manual control by the user when in a first mode, and that enables automatic control by at least the first and second elements when in a second mode.

13. The image capture device of claim 1, wherein the second element further comprises a plurality of Hidden Markov Models.

14. The image capture device of claim 1, further comprising a plurality of sensors configured to sense a plurality of operating conditions, wherein the first element is adapted to analyse inputs from the plurality of sensors to learn the associated plurality of operating conditions, wherein the second element is adapted to predict a plurality of values corresponding to the inputs from the plurality of sensors, and wherein the determined confidence level corresponds to the predicted values.

15. The image capture device of claim 1, wherein:
    the first element is adapted to analyse a plurality of control signals to learn the corresponding preference of the user; and
    the second element adapted to predict a plurality of values corresponding to the control signals,
    wherein the determined confidence level corresponds to the predicted values.

16. The image capture device of claim 1, further comprising a motion sensor.

17. The image capture device of claim 1, wherein the biometric sensor further comprises a sensor that detects eye movement.

18. The image capture device of claim 1, wherein the biometric sensor further comprises a sensor that detects face expression.

19. The image capture device of claim 1, wherein the biometric sensor further comprises a sensor that detects brain activity.

20. The image capture device of claim 1, wherein the biometric sensor further comprises a sensor that detects skin conductivity.

21. The image capture device of claim 1, further comprising a display adapted to display a confidence graphical indicator that indicates the degree of confidence in the predicted value to the user.

22. The image capture device of claim 1, further comprising a camera.

23. The image capture device of claim 1, further comprising a camera controller adapted such that at least one output of the manual control is used to determine capture of an image.

24. The image capture device of claim 1, wherein an output of the manual control corresponds to image capture exposure.

25. The image capture device of claim 1, wherein an output of the manual control corresponds to image capture field of view.

26. A method of training an image capture device, implemented by the image capture device, comprising:
    sensing a biometric condition of a user of the image capture device preceding image capture;
    predicting at least one image capture control parameter corresponding to an image capture control parameter specified by the user, the predicting based upon learned behavior of the user during prior similar operating conditions and the sensed biometric condition of the user;

determining a confidence level that corresponds to a degree of confidence in the predicted image capture control parameter from the predicted image capture control parameter and the image capture control parameter specified by the user;

indicating the confidence level that corresponds to a degree of confidence in the predicted image capture control parameter; and capturing an image in accordance with the predicted image capture control parameter.

27. The method of claim 26, further comprising predicting a plurality of image capture control parameters corresponding to a plurality of user specifiable control parameters, wherein indicating the confidence level corresponds to the degree of confidence in the predicted plurality of image capture control parameters.

28. The method of claim 26, further comprising determining the degree of confidence using statistics corresponding to previously sensed biometric user conditions and previously sensed image capture manual controls specified by the user during the corresponding previous image captures.

29. The method of claim 26, further comprising:
predicting an environment during image capture based upon a sensed environmental operating condition; and
indicating the predicted environment.

30. The method of claim 26, further comprising predicting failure when the predicting has not been made within a predefined time period of the user operating the image capture device.

31. The method of claim 26, further comprising predicting failure when the predicting is not at least equal to a threshold.

32. The method of claim 31, further comprising lowering the threshold for an image capture decision in the event of a low level prediction accuracy.

33. The method of claim 26, wherein sensing the biometric condition further comprises sensing eye movement.

34. The method of claim 26, wherein sensing the biometric condition further comprises sensing face expression.

35. The method of claim 26, wherein sensing the biometric condition further comprises sensing brain activity.

36. The method of claim 26, wherein sensing the biometric condition further comprises sensing skin conductivity.

37. The method of claim 26, further comprising predicting failure when the confidence level corresponds to a low level of prediction accuracy.

38. The method of claim 37, wherein predicting failure further comprises disabling automatic control such that the image is not captured in accordance with the predicted image capture control parameter.

39. The method of claim 37, wherein predicting failure further comprises indicating the predicted failure on a confidence graphical indicator.

40. The method of claim 37, wherein predicting failure further comprises indicating the predicted failure with an audible sound.

41. The method of claim 26, further comprising displaying the degree of confidence on a confidence graphical indicator.

42. The method of claim 26, further comprising pre-training the image capture device, the pre-training corresponding to a standard set of predictions for a plurality of given environment operating conditions.

43. A system for training an image capture device, comprising:
means for sensing a biometric condition of a user of the image capture device preceding image capture;
means for predicting at least one image capture control parameter corresponding to an image capture control parameter specified by the user, the predicting based upon learned behavior of the user during prior similar environment operating conditions and the sensed biometric condition of the user, the learned behavior of the user being independent from image data;
means for determining a confidence level that corresponds to a degree of confidence in the predicted image capture control parameter from the predicted image capture control parameter and the image capture control parameter specified by the user;
means for indicating a confidence level that corresponds to a degree of confidence in the predicted image capture control parameter; and
means for capturing an image in accordance with the predicted image capture control parameter.

44. The system of claim 43, further comprising:
means for predicting a plurality of image capture control parameters corresponding to a plurality of user specifiable control parameters; and
means for indicating the confidence level corresponding to a combined degree of confidence in the predicted image capture control parameters.

45. The system of claim 43, further comprising:
means for predicting a biometric condition during image capture based upon information from the means for sensing; and
means for indicating the predicted biometric condition.

46. The system of claim 43, further comprising means for predicting failure.

47. The system of claim 43, further comprising:
means for sensing an environment operating condition preceding image capture;
means for predicting an environment during image capture based upon information from the means for sensing an environment operating condition; and
means for indicating the predicted environment type.

* * * * *